W. T. RUNCIE.
FEED CONTROL FOR LIQUIDS.
APPLICATION FILED JUNE 16, 1916.
1,218,002.
Patented Mar. 6, 1917.
2 SHEETS—SHEET 1.
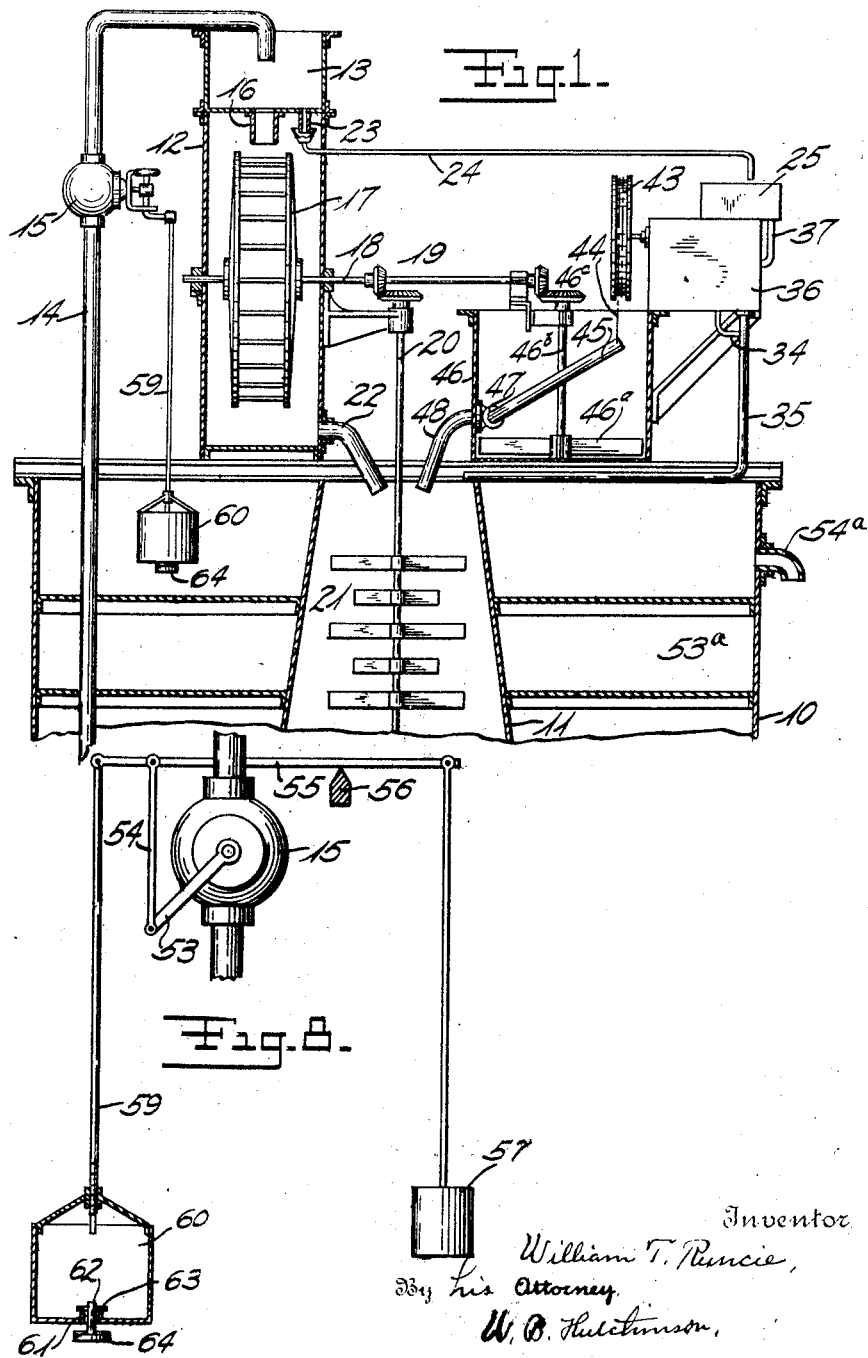
Inventor
William T. Runcie,
By his Attorney
W. B. Hutchinson.

W. T. RUNCIE.
FEED CONTROL FOR LIQUIDS.
APPLICATION FILED JUNE 16, 1916.
1,218,002.
Patented Mar. 6, 1917.
2 SHEETS—SHEET 2.
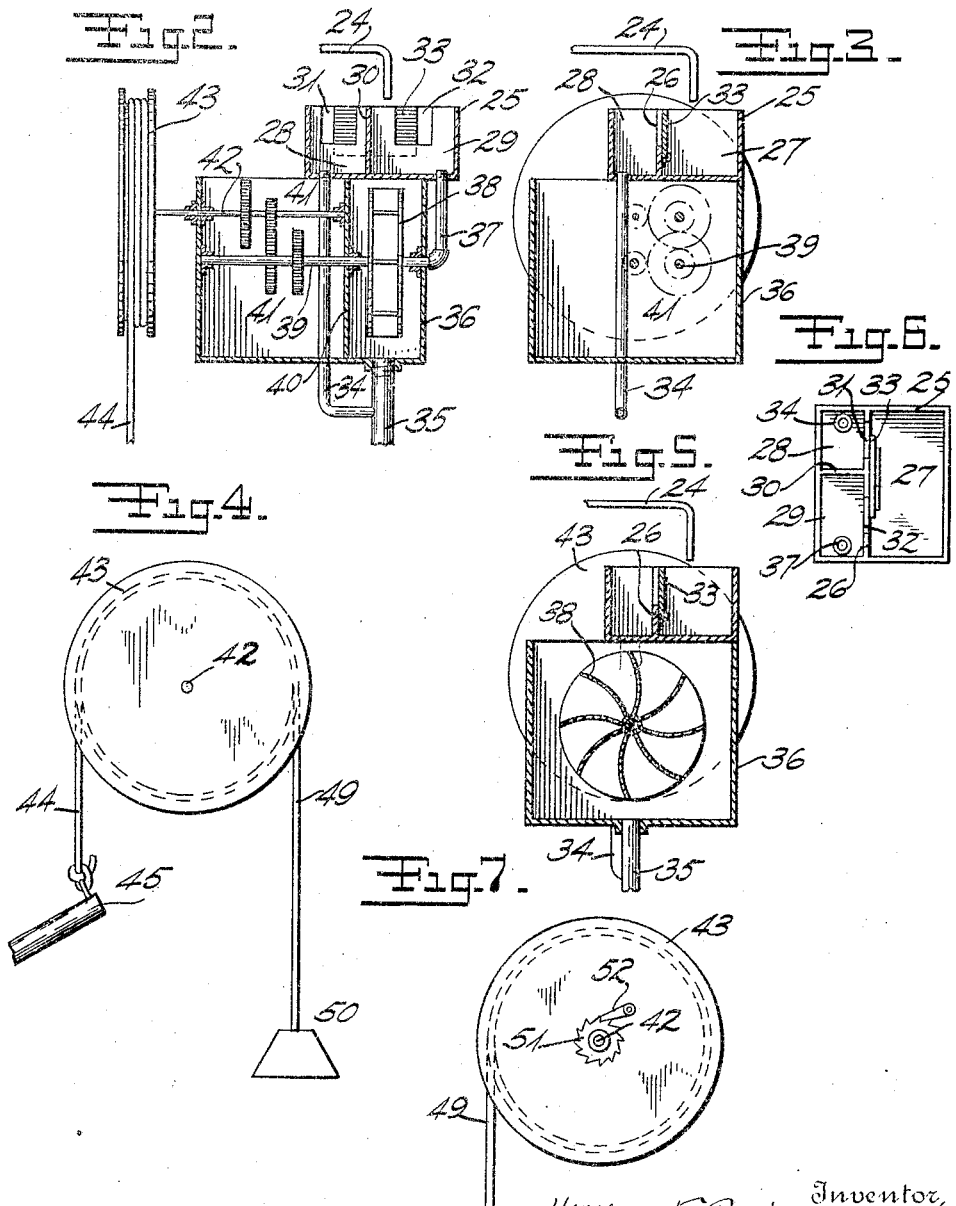
William T. Runcie, Inventor,
By his Attorney,
W. B. Hutchinson.

UNITED STATES PATENT OFFICE.

WILLIAM T. RUNCIE, OF MAPLEWOOD, NEW JERSEY.

FEED CONTROL FOR LIQUIDS.

1,218,002.  Specification of Letters Patent.  Patented Mar. 6, 1917.

Application filed June 16, 1916. Serial No. 103,934.

*To all whom it may concern:*

Be it known that I, WILLIAM T. RUNCIE, a citizen of the United States, and a resident of Maplewood, Essex county, New Jersey, have invented a new and useful Improvement in Feed Controls for Liquids, of which the following is a full, clear, and exact description.

My invention relates to improvements in feed controls for liquids, and more especially to that class of apparatus in which the supply of liquid to a given point, and particularly to another body of liquid, is regulated to the desired proportions and proportioned to the total supply of liquid. More particularly my invention is intended to control the supply of chemical solution to another body of liquid, such for instance as a body of water to be treated so that the supply of chemicals can be practically controlled, and to arrange the liquid feed so that the supply of chemicals is accurately proportioned to the total liquid supply so that the right quantity of chemical solution can always be maintained. The invention is especially applicable to water softeners in which a body of raw water is supplied to a tank, and from which tank the water is withdrawn for use in boilers or other places as desired. For such an apparatus my invention is arranged so as to withdraw a definite proportion of water from the main supply which goes into the tank, and this smaller portion which is drawn off drives a train of gearing which drops a feed pipe in the chemical solution tank so that the mouth of the feed pipe is always at the top of the chemical solution as the latter is drawn off and delivered into the main tank. In such apparatus the flow of water to the main tank and from the tank is not constant, and the apparatus controlling the feed of chemicals to the tank must be of such a nature as to operate when the water is being supplied to the tank so as to give the exact amount of chemicals desired. The principal object of my invention is to provide a simple apparatus by which this chemical supply can be accurately determined, and to make the feed control regulable so that any desired quantity of chemicals can be supplied, thus adapting the apparatus for use with waters of varying quality to attain the desired softening effect. As will be understood from the description which follows, the apparatus for controlling the supply of solution, such as a chemical solution, can be used for other purposes if desired.

Reference is to be had to the accompanying drawings forming a part of this specification, in which similar reference characters indicate corresponding parts in all the views.

Figure 1 is a broken vertical section showing the upper part of a water softening apparatus with my improvements applied thereto.

Fig. 2 is a detail vertical section through the means for controlling the chemical feed.

Fig. 3 is a section taken at right angles to the view shown in Fig. 2.

Fig. 4 is a broken elevation showing the connection between the lowering drum and the feed pipe in the chemical box.

Fig. 5 is a cross section through the feed control showing the water wheel thereof in cross section.

Fig. 6 is a plan of the valve box controlling the supply of water to the feed control.

Fig. 7 is an end view of the feed pipe lowering drum showing the opposite end from that shown in Fig. 4, and Fig. 8 is a detail of the means for shutting off the main feed when the main tank is full.

The tank 10 can be of any suitable construction, and this is the main supply tank which is to be filled with water to be softened and from which the water is drawn for use. It is preferably provided with a centrally arranged downtake pipe 11 into which the water and chemical are delivered as hereinafter described. Above the main tank and supported thereon is a casing 12 having a raw water-box 13 at the top to which water is supplied from the main inlet pipe 14, this latter being controlled by a valve 15 to which reference will be made hereafter. The water box 13 has a main outlet 16 through the bottom which discharges upon the water wheel 17, this being contained in the casing 12, and the shaft 18 of the water wheel connects by means of gearing 19 with a vertical shaft 20 which carries an agitator or stirrer 21 in the upper part of the downtake 11. The above arrangement is not claimed as novel, but shows a construction common to well-known softening apparatus.

Opening from the water-box 13 is a second and smaller outlet 23 which discharges through a pipe 24 into the valve box 25, this having a transverse partition 26 forming a main chamber 27, and at the side of this are smaller chambers 28 and 29 which are separated by a partition 30. The chambers 28 and 29 contact with the main chamber 27 through ports or openings 31 and 32 in the partition 26, and the relative sizes of these ports are controlled by the slide valve 33 which slides on the partition 26, and by means of which the size of the openings 31 and 32 can be perfectly regulated. The chamber 28 has a waste pipe 34 opening from the bottom and delivering into a pipe 35 which discharges into the downtake 11. The second chamber 29 discharges through the pipe 37 into the casing 36 of the feed control gearing. This apparatus as shown in the casing 36 is a well-known type of water meter, but the details are unimportant. As illustrated the pipe 37 delivers water to the hollow axle of a water-wheel 38 which drives a shaft 39 in the casing, and a partition 40 in the casing divides the latter so that the water-wheel is contained in a separate compartment with which the pipe 35, hereinafter referred to, connects. Obviously the type of water-wheel shown is not important, and any suitable wheel can be substituted for that illustrated. The shaft 39 connects through a train of gearing 41 with a countershaft 42 which is mounted in the casing 36 and projects outwardly therefrom, carrying at its outer end a drum 43, and this has a cable 44 wound thereon the free end of which connects with the free end of a feed pipe 45 which is contained in the chemical box 46. This box contains suitable chemicals in solution, and the feed pipe 45 connects by means of a flexible connection 47 with the discharge pipe 48 delivering into the downtake 11. It will thus be seen that no water is wasted, that the outflow from the main casing 12 passes through the pipe 22 to the downtake, the water for driving the feed control passes through the pipe 35 to the downtake, and the chemical solution passes through the pipe 48 to the downtake.

In practice the box 46 is supplied with a chemical solution sufficient for a run of any necessary length—say twelve hours, and it can be supplied in any convenient way. It is provided with a stirrer or agitator 46ᵃ which is driven by a shaft 46ᵇ, which in turn is driven by gears 46ᶜ connected with the shaft 18. The arrangement of the agitator is not claimed as novel.

It will be seen that the regulation of chemicals can be controlled to a nicety, first because a definite proportion of the water supply passes through the pipe 24 to the valve box 25, next because the valve 33 can be set so as to permit just the desired quantity of water to pass from the chamber 27 to the chamber 29, and from thence through the pipe 37 to the controlling water-wheel 38, and further that the gearing 41 is arranged and timed so that the drum 43 will unwind the cable 44 and permit the feed pipe 45 to drop at just the required rate of speed.

The drum 43 is provided with a second cord 49 to which a counter-balancing weight 50 is attached, and I prefer to have the drum connect with the shaft 42 by means of a ratchet wheel 51 which is fast on the shaft, and a pawl 52 which is pivoted on the drum, the latter being loose on the shaft so that the ratchet wheel and drum will turn together in one direction, but the drum will turn freely in the opposite direction. Thus when the feed pipe has been lowered to its limit and it is to be raised ready for re-use, one can pull down on the cord 49 thus winding up the cord 44, and the pawl 52 meanwhile sliding over the teeth of the ratchet wheel. I do not limit the invention to the particular means of connecting the gearing 41 with the feed pipe 45, as any suitable means can be substituted for the particular drum shown, but the arrangement of water-driven means for lowering the pipe as distinguished from float actuated devices, together with means for determining the amount of water used for driving the feed controlling apparatus, is important because it provides for very accurate regulation, and is of such a mechanical nature that it is not likely to get out of order.

I prefer to have filtering space 53ᵃ in the upper part of the tank 10, and the water outlet is through the pipe 54ᵃ at the top.

To provide for shutting off the water supply when the main tank is full, and for opening the valve 15 to the supply when the water in the tank is lowered, I use the construction shown in Figs. 1 and 2. As here shown the crank 53 connects with the stem of the valve 15, the latter being of any well-known balance valve type, and the crank 53 connects by the link 54 with the tilting lever 55 which is fulcrumed on a support 56. The lever 55 is provided with a counter-balancing weight 57 on one side of the fulcrum, and on the other side it connects by means of a rod 59 with a bucket 60 which is open at the top and has a vent 61 at the bottom through which extends the stem 62 of a float valve 64, a pin 63 through the upper part of the stem preventing the latter from dropping out. When the water rises in the tank it strikes and closes the float valve 64, and finally overflows into the bucket 60 which then drops, thus actuating the valve 15 and closing it, and when the water lowers the valve 64 drops permitting the escape of water from the bucket 60 and the weight 57 then tilts the lever 55 and opens the valve so as to permit the main water supply to flow again to the water box 13, feed control apparatus, and main tank.

While I have shown a suitable means for shutting off the water supply when the tank is full and for opening it when necessary, my invention is not at all limited to the means shown, and any suitable apparatus can be used for this purpose.

It will be seen that when the apparatus is operating, the main supply of water will pass over the water-wheel 17 and so through the pipe 22 to the downtake 11, and that the water-wheel will keep the stirrers 21 and 46ª in motion. Further that a smaller portion of raw water will pass through the pipe 24 to the valve box 25, that the desired amount of water and a measured amount will flow past the valve 33 to operate the water-wheel 38 and its connected gearing, and that the waste water from the valve box will flow to the downtake. Consequently none of the water will be wasted and the chemical supply will be determined with the utmost nicety.

It will also be understood that while I have shown my apparatus as superposed on a main tank, it can be placed at any desired elevation with relation to the tank without affecting the invention.

I claim:—

1. An apparatus of the kind described comprising a main tank, a main water supply for the tank, a valve box, means for diverting a portion of the water supply to the valve box, a chemical box adapted to supply solution to the tank, and a water-driven apparatus operated by water from the valve box and arranged to control the discharge from the chemical box.

2. An apparatus of the kind described comprising a main tank, a main water supply for the tank, a chemical box to supply the chemical solution to the tank, and water driven apparatus operated by water diverted from the main supply and operatively connected with the discharge from the chemical box to control it.

3. An apparatus of the kind described comprising a main tank, a main water supply for the tank, a chemical box, a movable feed pipe in the chemical box arranged to discharge chemical solution from the top of said solution, and water driven apparatus operated by water diverted from the main supply and connected with the feed pipe to control its height.

4. An apparatus of the kind described comprising a main tank, a main water supply for the tank, a chemical box to contain chemical solution having a discharge to supply the main tank, a swinging feed pipe in the chemical box connected with the discharge thereof, a water wheel, a connection between the water wheel and the feed pipe by which the movement of the water wheel lowers the pipe, and means for driving the water wheel from a supply diverted from the main water supply.

5. In an apparatus of the kind described, the combination with the chemical box adapted to contain a chemical solution, and a swinging member in said box controlling the discharge therefrom, of a water wheel, an operative connection between the water wheel and the swinging member in the chemical box, and means for supplying water to the water wheel.

6. In an apparatus of the kind described the combination with the chemical box and the swinging feed pipe therein, of a water wheel, a drum connected with the water wheel and with the feed pipe, and means for driving the water wheel.

7. In an apparatus of the kind described the combination with the chemical box and the swinging feed pipe therein, of a water wheel, means for driving the water wheel, a shaft connected by gearing with the water wheel, a drum having a ratchet connection with the said shaft, and a cable connection between the drum and the feed pipe.

8. An apparatus of the kind described comprising a main tank, a main water supply, a chemical box discharging into the main tank, a swinging feed pipe in the chemical box connected with the outlet of the chemical box, a water wheel connected by a train of gearing with the feed pipe, means for driving the water wheel by water diverted from the main supply, and means for discharging said diverted water into the main tank.

9. In an apparatus of the kind described the combination with the main tank, the chemical box, and the swinging feed pipe in the chemical box arranged to discharge into the main tank, of water-driven apparatus controlling the feed pipe, and a valve box, said valve box having a main compartment, a second compartment connected with the water-driven apparatus, a third compartment delivering into the main tank, and a valve controlling the supply of water from the main compartment to the second and third compartments of the valve box.

WILLIAM T. RUNCIE.

Witnesses:
 WARREN B. HUTCHINSON,
 M. G. O'DONNELL.